United States Patent [19]

Elliott

[11] Patent Number: 4,883,304

[45] Date of Patent: Nov. 28, 1989

[54] VEHICULAR WINDOW SUN SHIELD

[76] Inventor: Everett E. Elliott, 825 S. 5th St., Atchison, Kans. 66002

[21] Appl. No.: 200,760

[22] Filed: May 31, 1988

[51] Int. Cl.$^4$ ................................................ B60J 3/02
[52] U.S. Cl. .................................. 296/97.8; 296/97.9; 160/84.1; 160/370.2
[58] Field of Search ...................... 296/97.1, 97.8, 97.7, 296/97.9; 160/84.1, 368.1, 370.2, 403, DIG. 3

[56] References Cited

U.S. PATENT DOCUMENTS

| | | | |
|---|---|---|---|
| 2,821,248 | 1/1958 | Irvine | 160/370.2 |
| 3,751,100 | 9/1973 | Keyes | 160/370.2 X |
| 3,880,461 | 4/1975 | Flanagan | 296/95.1 |
| 4,109,957 | 8/1978 | Polizzi et al. | 296/95.1 |
| 4,202,396 | 5/1980 | Levy | 160/107 |
| 4,353,593 | 10/1982 | Henson | 296/97.6 |
| 4,560,245 | 12/1985 | Sarver | 296/97.7 |
| 4,606,572 | 8/1986 | Maguirre | 296/97.7 |
| 4,647,102 | 3/1987 | Ebrahimzadeh | 296/97.8 X |
| 4,652,039 | 3/1987 | Richards | 296/97.7 |
| 4,671,334 | 6/1987 | Yapegar et al. | 296/97.8 |
| 4,671,558 | 6/1987 | Cline | 296/97.7 |
| 4,733,710 | 3/1988 | Haines | 160/84.1 |
| 4,775,180 | 10/1988 | Phillips | 296/97.8 X |
| 4,801,170 | 1/1989 | Moore | 160/DIG. 3 X |

FOREIGN PATENT DOCUMENTS 2257451 8/1975 France .
618233 7/1980 Switzerland ...................... 160/368.1

Primary Examiner—Dennis H. Pedder
Attorney, Agent, or Firm—Hovey, Williams, Timmons & Collins

[57] ABSTRACT

A lightweight, flexible sun shade for the windshield of a vehicle includes a pleated panel of flexible fabric material along with three stiffening elements that are fixed to a right side, a central and a left side portion of the panel. The central stiffening element is split at its upper end for flexible extension around the post of a rear view mirror. Each stiffening element has an upper, finger engageable segment that extends above the top of the panel to facilitate grasping of the elements and removal of the assembly from the windshield.

2 Claims, 1 Drawing Sheet

VEHICULAR WINDOW SUN SHIELD

BACKGROUND OF THE INVENTION

1. Field of the Invention

This invention relates to a pleated fabric sun shade for windows and particularly windshields of vehicles including cars, trucks and the like, and particularly concerns a shade which can be closely fitted to the window around the mirror and yet readily removed and collapsed to a relatively small profile package for storage.

2. Description of the Prior Art

Removable, interior sun shades for the windshield of cars and other vehicles have become increasingly popular in recent times. Shades of this type are useful for reducing the amount of heat which might otherwise enter and accumulate within the passenger compartment. Moreover, the use of sun shades can decrease fading and increase the longevity of the dashboard which is typically comprised of synthetic resinous materials.

Certain types of sun shades for motor vehicles, such as that shown in U.S. Pat. No. 4,202,396, are manufactured from a sheet of rigid, corrugated cardboard material that is foldable along a number of vertical fold lines to a collapsed orientation for storage. However, such shades do not in general fit tightly against the interior surface of the windshield, and thereby do not efficiently reduce the rate of heat transmission into the passenger compartment. Also, portions of the dashboard may be exposed to damaging radiation from the sun. Moreover, the thickness of cardboard suitable for these types of shades is of a substantial dimension and consequently causes the shade when collapsed to be somewhat bulky and difficult to store when not in use.

Others in the past have suggested the use of other types of materials including, in some instances, pleated fabrics. My attention has been called to the following U.S. Pat. Nos.: 4,671,558, 4,652,039, 4,647,102, 4,606,572, 4,560,245, 4,353,593, 4,109,957, 3,880,461, 3,751,100, as well as French Pat. No. 2,257,451. Unfortunately, for one reason or another, the sun shades described and illustrated in these references are not entirely satisfactory.

SUMMARY OF THE INVENTION

My present invention overcomes the disadvantages noted above with respect to conventional sun shades for vehicles by provision of a pleated fabric shade that fits relatively closely against substantially the entire interior surface of the windshield and which presents an aesthetically pleasing appearance when viewed from the interior or exterior of the vehicle. The shade may be easily removed from the windshield and collapsed to a compact, relatively small profile package which can be stored on top of the dashboard or alternatively above the visors adjacent the ceiling.

In accordance with my invention, the shade is comprised of a pleated fabric panel along with three stiffener elements, two of which are secured to lateral marginal edge portions of the panel and the remaining of which is secured to a central portion of the panel including along sides of a placket or channel that is formed in the panel for reception of a mounting post of the rear view mirror. The three stiffener elements provide sufficient rigidity for the assembly so that the fabric does not collapse and fall away from the interior surface of the windshield. In addition, the stiffener elements provide a solid backing for the mounting of sections of hook and pile fastener structure which releasably couples the assembly to side wall sections of the vehicle along the lateral edges of the windshield and also for mounting of hook and pile fastener structure in regions above the mirror post in order to close the placket as desired.

In preferred embodiments of the invention, each of the stiffener elements extends above the top of the fabric panel and presents segments which can thus be easily grasped in order to facilitate uncoupling of the hook and pile fasteners whenever the assembly is removed from its use position adjacent the windshield. Advantageously, each stiffener element is somewhat flexible in order to conform to interior contours of various vehicles presently available without, for example, becoming caught against the ceiling of the passenger compartment.

In other forms of the invention, a pair of straps are connected to one marginal edge of the panel and two sections of hook and pile fastening structure are connected to each strap. A first section of the fastening structure is connected to each strap near the marginal edge of the panel for releasably securing the latter to the wall sections of the vehicle near the window, while a second section of fastening structure is located adjacent a free terminal end of each strap. When the assembly is not in use, the panel can be collapsed and the straps extended around the collapsed panel in such a fashion that the second sections of hook and pile structure come into contact with the corresponding first sections in order to retain the panel in its folded orientation for storage.

These and other objects of the invention will become more apparent following a reading of the detailed description which follows when taken in conjunction with the drawings.

DETAILED DESCRIPTION OF THE DRAWINGS

Figure 1:
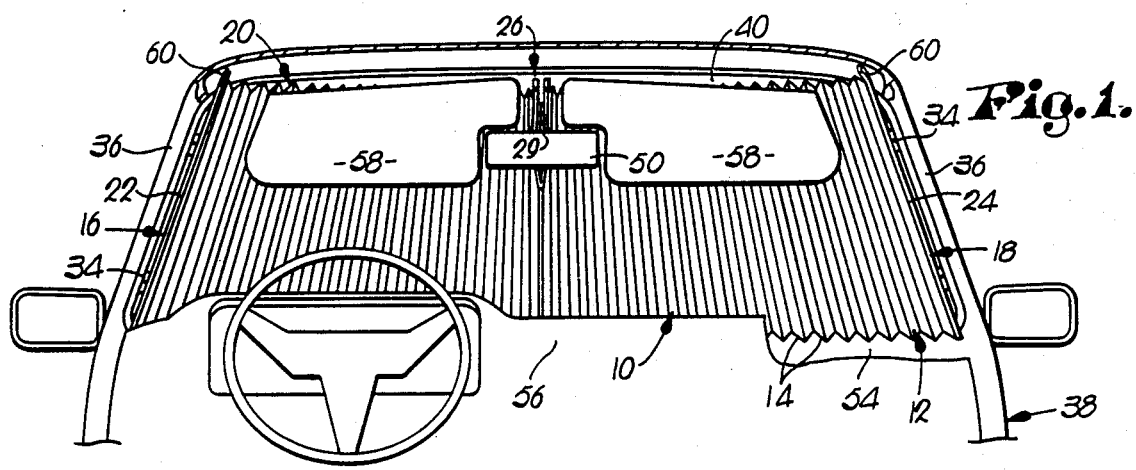
FIG. 1 is a fragmentary, end elevational view of the interior of a passenger compartment of a vehicle along with a sun shade constructed in accordance with the present invention, with a portion of a dashboard of the vehicle cut away to reveal a lower edge of the shade.
Figure 2:
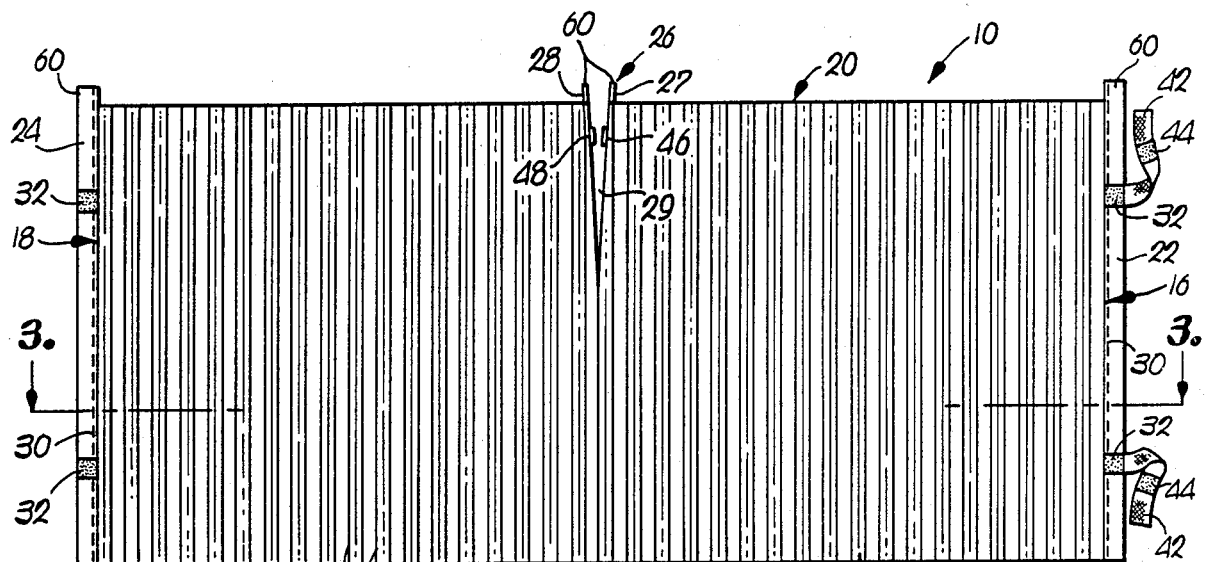
FIG. 2 is a side elevational view of the sun shade illustrated in FIG. 1 except that the shade has been extended to a somewhat more rectangular orientation for exemplary purposes.

A sun shade assembly, broadly designated by the numeral 10 in FIGS. 1-5, includes a panel 12 that is comprised of a flexible membrane or fabric material having a number of permanent upright lines of fold or pleats 14. The membrane may consist of a polyester fabric having a reflective, aluminized outer facing surface. The panel 12 presents a pair of opposed, lateral marginal edge portions 16, 18 disposed along opposite sides of the panel 12 and also includes an upper portion 20 disposed at the center of panel 12.

The shade assembly 10 has stiffener structure that includes three elongated, flexible stiffening elements 22, 24, 26 of a length somewhat greater than the height of panel 12. Two of the stiffening elements 24, 26 extend along the length of the marginal edge portions 16, 18 respectively while the remaining stiffening element 26 extends along an upright, central axis of panel 12 including the upper panel portion 20.

Figure 3:
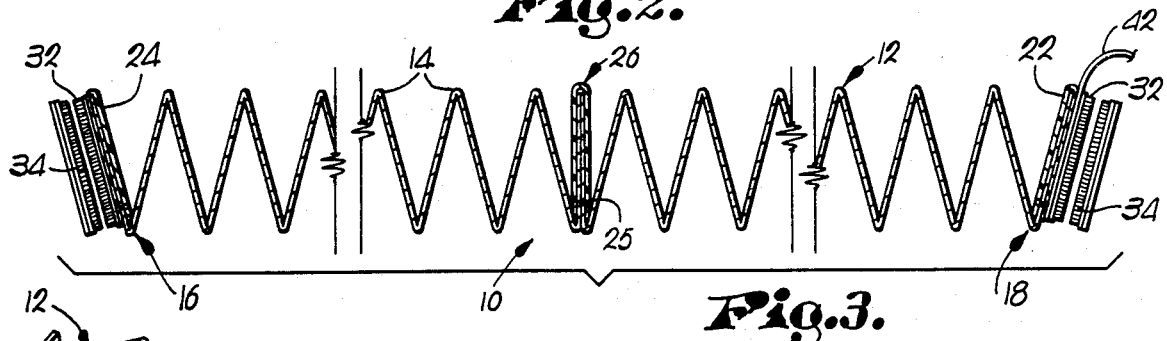
FIG. 3 is an enlarged, fragmentary, horizontal sectional view taken along line 3—3 of FIG. 2.
Figure 4:
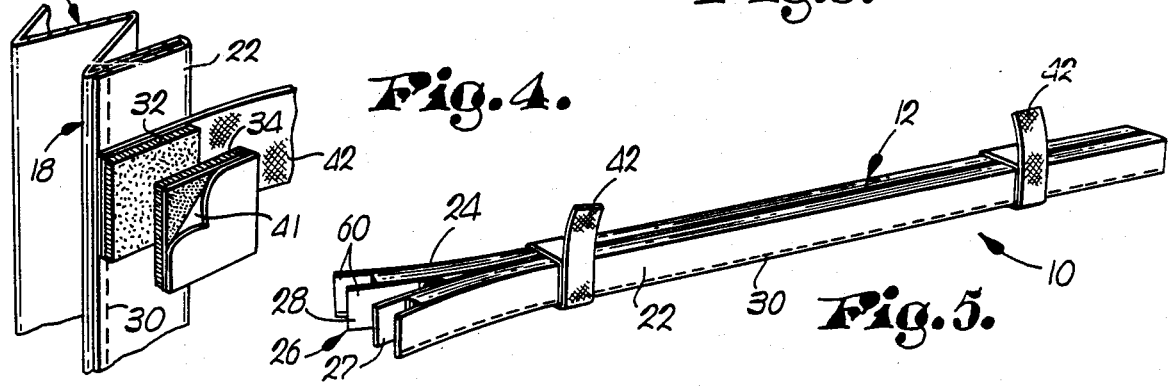
FIG. 4 is an enlarged, perspective, fragmentary view of hook and pile fastening structure of the sun shade shown in FIGS. 1-3 for releasably securing the shade, to wall sections of the vehicle adjacent a windshield.

As illustrated in FIGS. 3 and 4, the stiffener elements 22, 24 are U-shaped in horizontal section in order to receive the lateral edges of panel 12 and prevent fraying of the fabric. A stitch line 30 (see, e.g., FIGS. 4 and 5) extends along the length of the elements 22, 24 for securing the latter to the marginal edge portions 16, 18.

The stiffening element 26 presents in areas below the upper portion 20 a generally U shaped configuration in horizontal section similar to the configuration of elements 22, 24. A line of stitching 25 is provided to bind lower portions of the element 26 with two folded sections of the panel 12 therebetween. An upper section of the stiffening element 26 is separated to present two portions 27, 28 that extend along opposite sides of a placket or channel 29 formed in panel 12.

Two sections of hook and pile fastening structure 32 are connected to one face of each of the stiffening elements 22, 24 in regions adjacent the marginal edge portion 16, 18 respectively of panel 12. The fastening structure 32 is adapted for releasable coupling with corresponding, mating sections of hook and pile fastening structure 34 that are mounted along opposed side wall sections 36 of a vehicle 38 near lateral side edges of a windshield 40 (FIG. 1). Each of the fastening structures 32, 34 advantageously has a rear face carrying a quantity of pressure sensitive adhesive for connecting the structures 32, 34 to the elements 22, 24 and side wall sections 36 respectively. In addition, the fastening structures 34 are initially protected by a protective backing 41 (FIG. 4) which is peeled away just before the structures 34 are mounted on the side wall sections 36.

Figure 5:
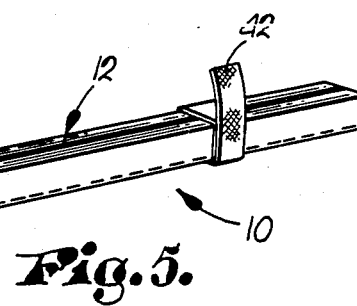
FIG. 5 is a view of the shade illustrated in FIGS. 1-4 except that the shade has been removed from a position adjacent the windshield and collapsed to a folded orientation for storage.

Preferably, a pair of elongated, flexible straps 42 are fixed to the stiffening element 22 and, as shown best in FIGS. 3 and 4, the fastening structures 32 are in turn mounted directly on the end of the straps 42 adjacent element 22. A terminal end portion of each strap 42 carries a section of hook and pile fastening structure 44 (see Fig. 2). When the panel 12 is collapsed by folding the same along its pleats to the orientation that is illustrated in FIG. 5, each strap 42 may be extended around the collapsed panel 12 and the fastening structure 44 then brought into contact with the complemental fastening structure 32 in order to retain the straps 42 in place and thereby releasably hold the assembly 10 in its folded orientation.

Finally, each of the upper element portions 27, 28 carries a section of complemental hook and pile fastening structure 46, 48 respectively. When the assembly 10 is installed as shown in FIG. 1 adjacent windshield 40, the post (not shown) of the mirror 50 is received in the channel 29 formed between the element portions 27, 28 until such time as the fastening structure 46, 48 is located above the post of mirror 50. At this time, the fastening structures 46, 48 are brought into contact with each other in order to close the upper, central portion 20 of panel 12 in regions above the mirror 50.

Conveniently, the lower end portion of panel 12 can be placed within a small recess 54 (FIG. 1) which extends horizontally between a dashboard 56 and the lower marginal edge of the windshield 40 of many conventional vehicles. In addition, visors 58 of the vehicle 36 may be lowered as depicted in FIG. 1 in order to retain the panel 12 in close disposition to windshield 40.

Advantageously, the flexibility of the stiffening elements 22, 24, 26 enables the assembly 10 to fit within the confines of a variety of vehicles. For example, the vehicle 38 illustrated in FIG. 1 has a somewhat curved ceiling at opposite, upper corners of the windshield 40 and thus the side stiffening elements 22, 24 can likewise deflect in a curve as the fastening structures 32 are brought into releasable securement with fastening structures 34. The flexible elements 22, 24, 26 consequently avoid damage to the ceiling which may, for example, be constructed of cloth materials.

Each of the stiffening elements 22, 24, and each of the portions 27, 28 of stiffening element 26 includes upper, finger engageable segments 60 that extend upwardly to a height spaced above the top of panel 12 for facilitating grasping of the elements 22, 24, 26 when desired. When, for instance, it is desired to remove the assembly 10 from its use position adjacent the windshield 40, the user simply grasps the segment 60 of the left stiffening element 22 in order to pull the corresponding, left fastening structures 32 away from the structures 34, and then the user grasps the segments 60 of portions 27, 28 to separate fastening structures 46, 48 from each other. Next, segment 60 of the right stiffening element 24 is gripped to pull away the corresponding fastening structures 32 from fastening structures 34 mounted on the right side wall section 36 of vehicle 38.

The inherent flexibility of the material comprising the panel 12, as well as the flexibility of the stiffening elements 22, 24, 26 is desirable also for facilitating maneuvering of the assembly 10 around the dashboard 56, mirror 50 as well as other obstructions which may be present within vehicle 38. The assembly 10 is also somewhat flexible even when somewhat collapsed to its folded orientation as shown in FIG. 5, and as such is easy to handle and store, for example, in a rest position on top of the dashboard 56 or alternatively beneath the seat, in the trunk or above the visors 58 of vehicle 38.

While the foregoing represents a detailed description of my currently preferred embodiment of the invention, it is understood that those skilled in the art may make various modifications or additions to my invention without departing from the gist and essence of my contribution to the art. As such, the invention should be deemed limited only by a fair scope of the claims which follow along with their mechanical equivalents thereof.

I claim:

1. A sun shade for a windshield of a vehicle, wherein said vehicle includes side wall sections extending along lateral edges of said windshield and wherein said vehicle includes a rear view mirror and a mounting post connecting said mirror to said windshield, said shade comprising:

a collapsible panel comprised of a flexible membrane having a plurality of pleats for collapse of said panel along a longitudinal axis, said pleats extending transversely to said longitudinal axis, said panel presenting a pair of opposed, lateral marginal edge portions and a normally upper central portion extending longitudinally intermediate said lateral marginal edge portion when said panel is in an extended orientation, said upper central portion including a transversely extending channel for receiving said mounting post when said shade is installed with said longitudinally extending axis in a generally horizontal orientation, said opposed lateral marginal edge portions positioned adjacent said side walls and said upper central portion positioned adjacent said post;

means for releasably securing each of said marginal edge portions of said panel to a respective one of said wall sections of the vehicle; and stiffener structure including three elongated, flexible elements for supporting said panel in an extended orientation adjacent said windshield, two of said three elements being connected to respective ones of said marginal edge portions of said panel and extending generally parallel to said pleats along said respective edge portions, the remaining stiffener element being secured to said panel and extending along at least one side of said channel for reinforcing said panel in the vicinity of said mirror, said remaining stiffener element including two upper, separable portions joined at lower ends; and including means for releasably coupling together said upper separable portions at a location above the mirror post.

2. The invention as set forth in claim 1, wherein said upper portions include upper, finger engageable segments that extend to a height spaced above said panel for facilitating uncoupling of said portions from each other.

* * * * *